US008714343B2

(12) United States Patent
Secchi et al.

(10) Patent No.: US 8,714,343 B2

(45) Date of Patent: May 6, 2014

(54) CONTAINER-HANDLING MACHINE

(75) Inventors: Antonio Secchi, Parma (IT); Luca De Vincenzi, Parma (IT)

(73) Assignee: SIDEL S.p.A. con Socio Unico (IT)

( * ) Notice: Subject to any disclaimer, the term of this patent is extended or adjusted under 35 U.S.C. 154(b) by 120 days.

(21) Appl. No.: 13/389,780

(22) PCT Filed: Aug. 12, 2009

(86) PCT No.: PCT/IT2009/000383

§ 371 (c)(1), (2), (4) Date: Apr. 24, 2012

(87) PCT Pub. No.: WO2011/018808

PCT Pub. Date: Feb. 17, 2011

(65) Prior Publication Data

US 2012/0199439 A1 Aug. 9, 2012

(51) Int. Cl.
*B65G 47/34* (2006.01)

(52) U.S. Cl.
USPC .................................... 198/478.1; 198/470.1

(58) Field of Classification Search
USPC ........... 198/469.1, 470.1, 478.1, 480.1, 481.1
See application file for complete search history.

(56) References Cited

U.S. PATENT DOCUMENTS 3,559,702 A * 2/1971 Riesenberg ................... 141/128
4,102,355 A * 7/1978 Hansen .................... 137/596.15
4,445,549 A 5/1984 Bernhard
4,502,589 A * 3/1985 Fichtner ..................... 198/478.1
4,563,935 A * 1/1986 Rinck et al. ................ 198/478.1
5,007,466 A * 4/1991 Mueller et al. .................... 141/1
7,497,323 B2 * 3/2009 Davidson et al. .......... 198/474.1
2003/0085681 A1 5/2003 Sakamoto et al.

FOREIGN PATENT DOCUMENTS

JP 08-295397 A 11/1996
JP 10-086998 A 4/1998

OTHER PUBLICATIONS

"International Application Serial No. PCT/IT2009/000383, International Search Report mailed May 31, 2010", 3 pgs.
"International Application Serial No. PCT/IT2009/000383, Written Opinion mailed May 31, 2010", 4 pgs.

* cited by examiner

*Primary Examiner* — James R Bidwell
(74) *Attorney, Agent, or Firm* — Schwegman Lundberg & Woessner, P.A.

(57) ABSTRACT

There is described container-handling machine comprising a carousel rotatable about an axis and supporting a plurality of holding elements adapted to cooperate with respective containers; and a slip-ring comprising a first rotor rotatable integral with carousel about said axis, and a first stator exchanging, in use, at least one between power and control signals with first rotor and fixed with respect to carousel; container-handling machine further comprises an encoder housed within a cavity defined between first stator and first rotor, adapted to detect at least the angular position of carousel with respect to axis, and comprising a second rotor rotatable integrally with first rotor and a second stator connected to first stator.

15 Claims, 5 Drawing Sheets

CONTAINER-HANDLING MACHINE

PRIORITY CLAIM AND RELATED APPLICATIONS

This application is a nationalization under 35 U.S.C. 371 of PCT/IT2009/000383, filed Aug. 12, 2009 and published as WO 2011/018808 A1 on Feb. 17, 2011; which application and publication are incorporated herein by reference in their entirety.

TECHNICAL FIELD

The present invention relates to a container-handling machine for containers, such as bottles, pots, cans and the like.

BACKGROUND ART

Typical examples of container-handling machine used in the food-product bottling industry are blowing machines, filling machines and/or labelling machines.

Container-handling machines substantially comprise a carousel, which is rotatable along an axis and supports a plurality of container-holding plates.

Furthermore, container-handling machines could also comprise an encoder in order to detect the angular position of the carousel. The encoder is normally connected to a shaft of the carousel rotating about the axis by a transmission group, i.e. belt, pulley or gear.

The presence of the transmission group between the shaft of carousel and the encoder inevitably causes mechanical plays which may penalize the accuracy of the measure carried out by the encoder.

Furthermore, due to the presence of the transmission group, encoder is mounted quite remote from the shaft. Accordingly, the vibrations caused by operation of container-handling machine may further penalize the accuracy of the measure carried out by the encoder.

Known container-handling machine may also comprise a so-called “slip-ring” in order to transfer power and/or control signals from a static supply unit and a rotatable component, as for example the shaft of the carousel. More precisely, slip-ring may transfer electrical, hydraulic or pneumatic power or control signals.

Very briefly, slip-ring comprises a conductive ring mounted on the rotatable component and insulated from it, and a plurality of fixed brushes in contact with the conductive ring.

Due to the lack of space, it could be very difficult to fix the encoder to the shaft of the carousel when container-handling machine comprises slip-ring.

A need is felt within the industry to accurately detect the angular position of the shaft of the carousel of a container-handling machine comprising a slip-ring.

Furthermore, a need is felt within the industry to meet the above requirement without changing the design of the main components of the container-handling machine, for instance the carousel.

The above-mentioned needs are especially felt when the container-handling machine is a labelling machine typically used to apply labels onto containers.

In this case, as a matter of fact, there is a connection between the shaft and the supporting elements of respective container, and the angle and the speed of the supporting elements are strongly higher than the angle and the speed of the shaft.

Therefore, even very small errors in the measure of the position of the shaft may lead to considerable errors in the final position of the label onto the container.

In more general terms and regardless of the technical sector, a need is felt to accurately detect the angular position of a carousel of a rotary machine comprising a slip-ring.

SUMMARY

Various examples provide a handling-container machine, designed to meet at least one of the above requirement in a straightforward, low-cost manner.

According to examples of the present subject matter, there is provided a container-handling machine as claimed in claim 1.

Furthermore, according to the present subject matter, there is provided a machine as claimed in claim 12.

BRIEF DESCRIPTION OF THE DRAWINGS

In the following a preferred, non-limiting embodiment of the present invention will be described by way of example with reference to the accompanying drawings, in which.

DETAILED DESCRIPTION

Figure 1:
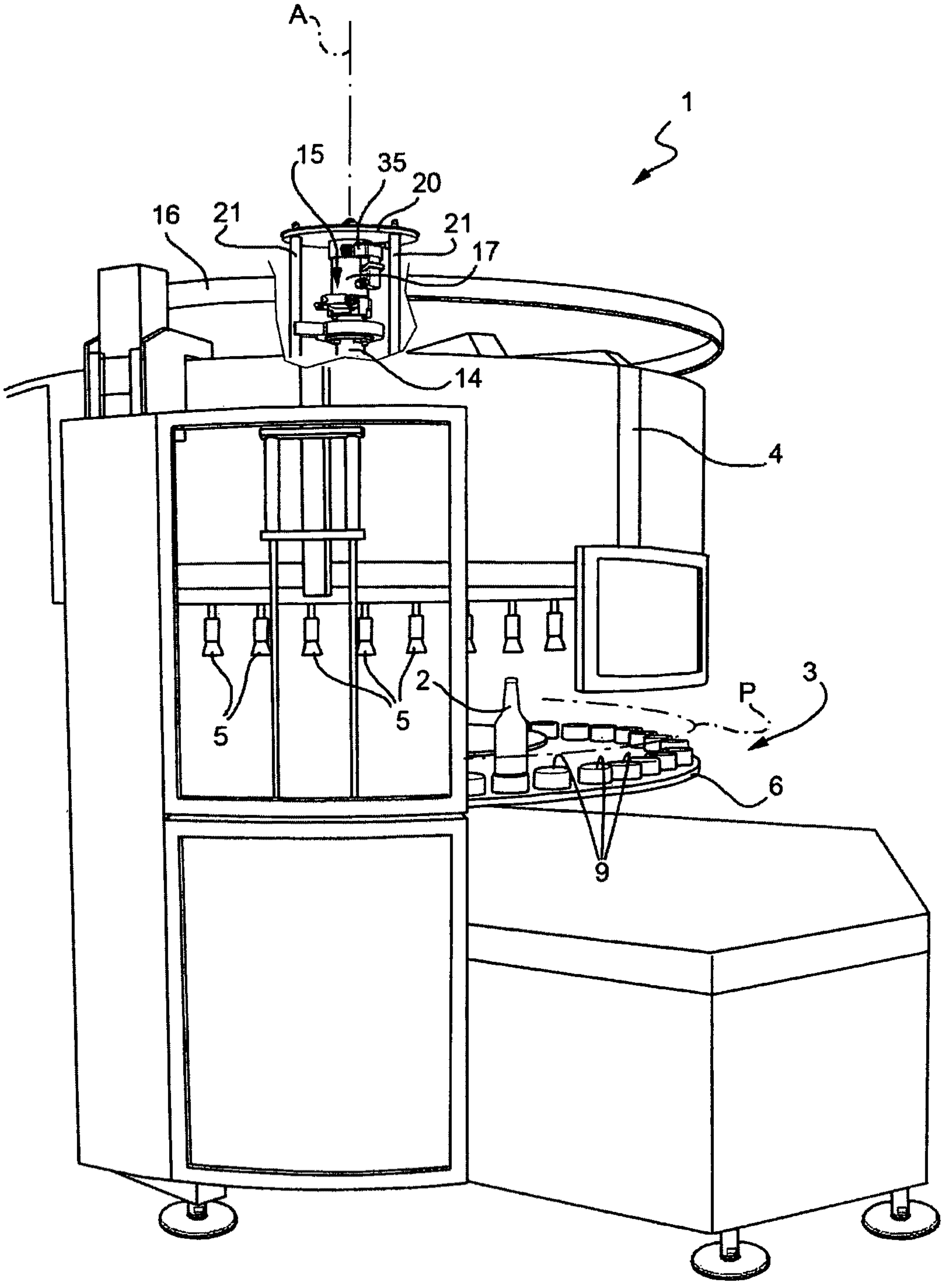
FIG. 1 is a perspective view of a labelling machine, with parts removed for clarity.
Figure 2:
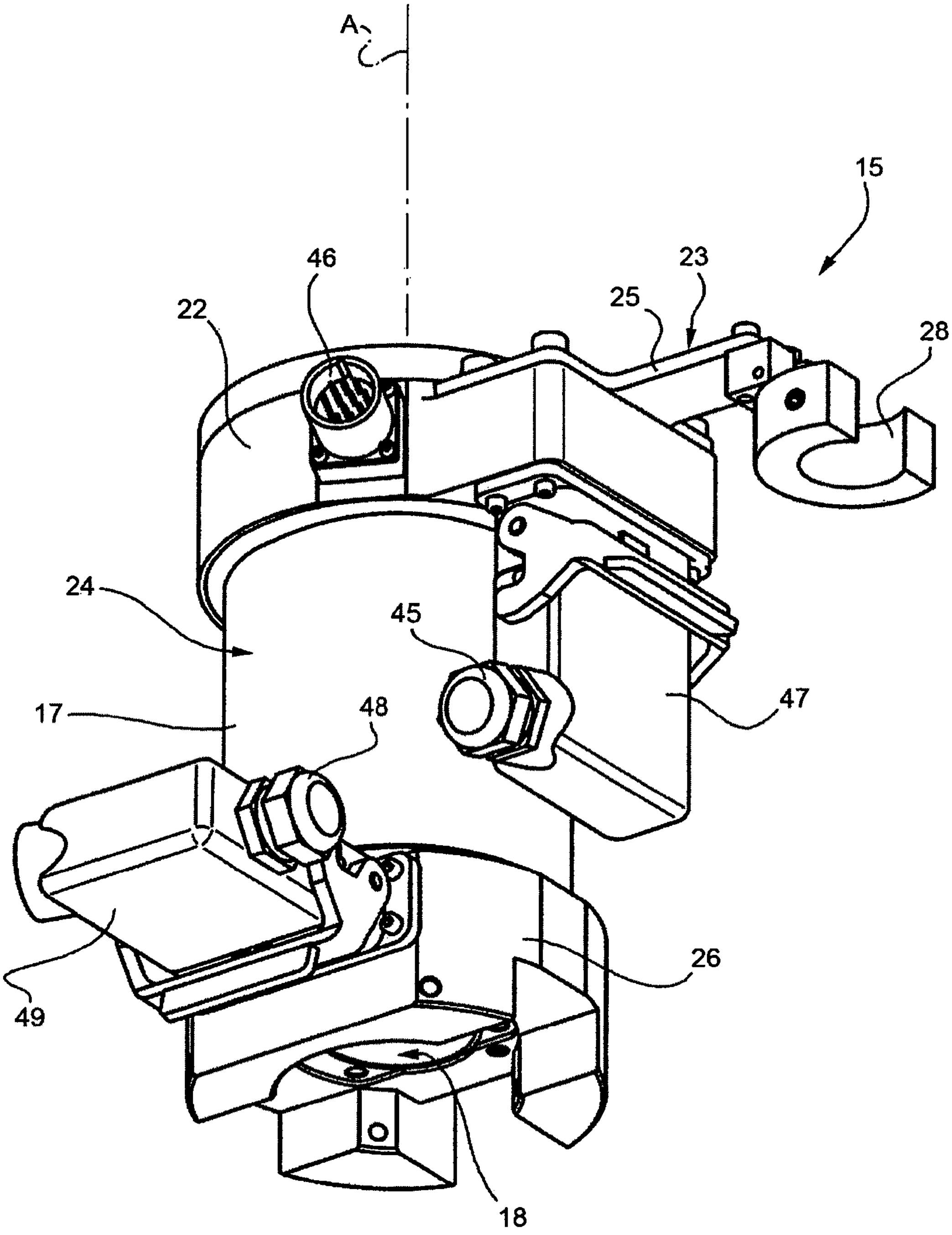
FIGS. 2 and 3 are larger-scale perspective views of a slip-ring of labelling machine of FIG. 1.
Figure 3:
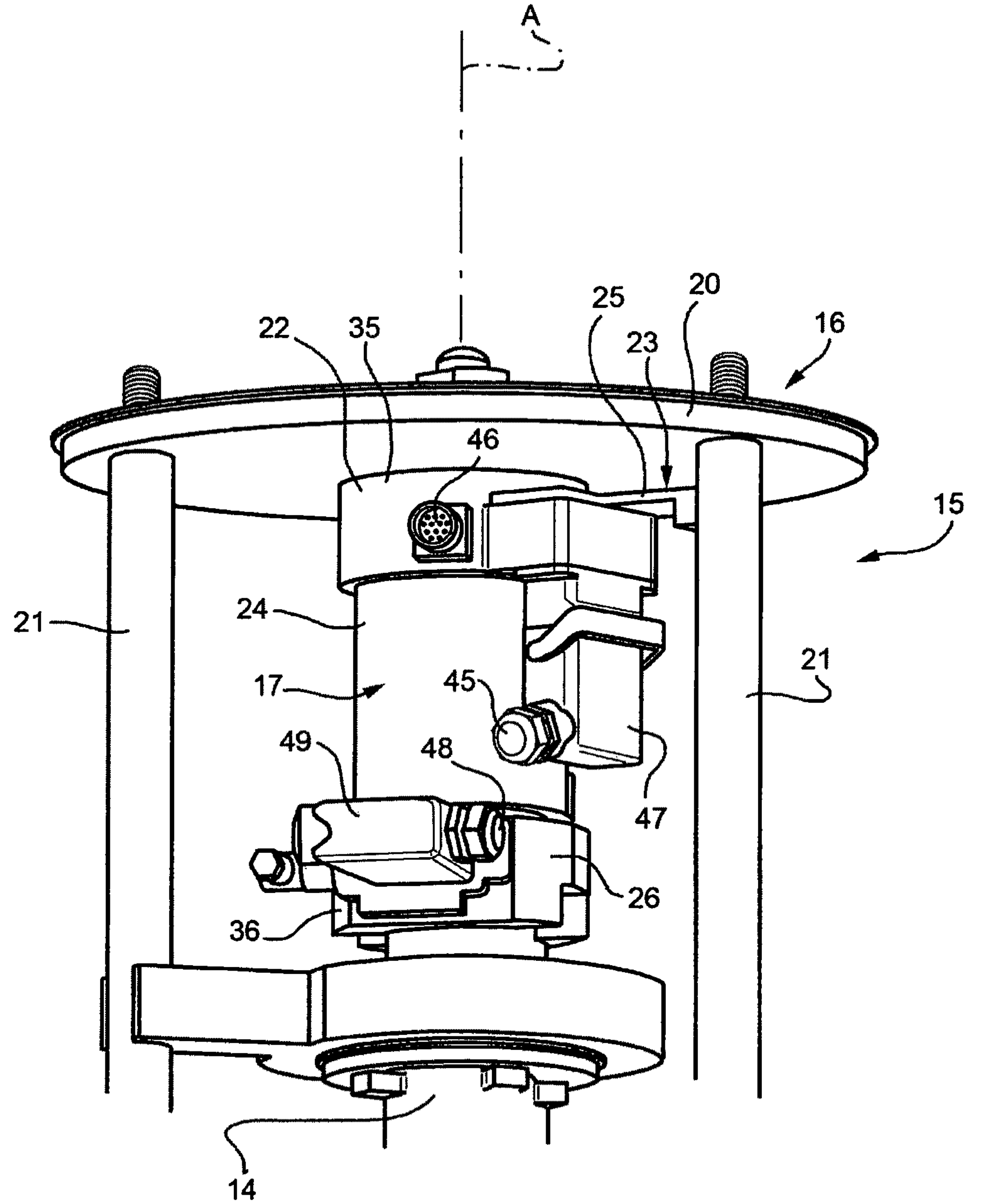

Number 1 in FIG. 1 indicates as a whole container-handling machine for containers, such as bottles, pots, cans and the like.

More precisely, number 1 in FIG. 1 indicates a labelling machine for applying a plurality of labels (not shown) to respective containers 2.

Labelling machine substantially comprises:

- a carousel 3 for conveying containers 2 (only one of which is shown in FIG. 1) which are to be labelled along an arc-shaped pathway P;
- a tubular support structure 4 which protrudingly bears a plurality of bell-shaped elements 5 movable parallel to axis A between a raised position and a lowered position; and
- a labelling group (not shown) at which labels are applied onto relative containers 2 moving along the pathway P.

In greater detail, carousel 3 substantially comprises a wheel 6 rotatable about an axis A vertical in use, and defining on a peripheral circumferential edge a plurality of support elements 9 for respective containers 2.

Wheel 6 is driven in rotation about axis A by a motor not shown.

Support elements 9 are arranged below respective bell-shaped elements 5. More precisely, support elements 9 and bell-shaped elements 5 support respectively bottom and top end of relative containers 2.

Labelling machine may apply different kind of labels onto respective containers 2.

Non-limitative example of labels are cold-glue labels (in this case glue temperature ranges about 20-25 centigrade degrees), hot-melt labels (in this case the temperature of glue is about 150 Celsius degree), pre-cut labels, uncut labels applied onto a reel, self-adhesive labels and glue free labels.

Labelling machine further comprises a slip-ring 15.

Slip-ring 15 is intended to transmit signals and power between rotating parts of labelling machine and a fixed supply unit.

For example, slip-ring 15 may transmit hydraulic, pneumatic and electric power and signals between rotating parts of labelling machine and a fixed supply unit.

In the embodiment depicted, slip-ring 15 is intended to feed the rotating parts of labelling machine with both electrical power and control signals.

Slip-ring 15 substantially comprises (FIGS. 2 to 6):

- a stator 17 fixed to a frame 16 fitted to a fixed structure of labelling machine 1; and
- a hollow shaft 18 rotating about axis A integrally with wheel 6 and electrically connected to stator 17 so as to be fed with both electrical power and control signals.

In greater detail, frame 16 comprises a plate 20 orthogonal to axis A and a pair of column 21 parallel to axis A. Columns 21 are connected to both plate 20 and to the fixed structure of labelling machine 1.

Stator 17 is hollow and substantially comprises (FIGS. 2 to 4):

- a flange 22 provided with appendix 23 coupled with one of the columns 21 in order to prevent stator 17 from rotating about axis A; and
- a main body 24 axially interposed between flanges 22, 26.

More precisely, appendix 23 comprises an arm 25 and a C-shaped element 28 engaging one of columns 21.

In particular, arm 25 extends substantially along a radial direction with respect to axis A and carries element 28 at its end opposite to axis A.

Shaft 18 is coaxial with respect to stator 17, extend in part within stator 17 and is supported by stator 17 through bearings (not shown).

Shaft 18 is made integrally with a flange 26.

Wheel 6 is driven in rotation by a motor (non shown) through a main shaft (not shown).

Shaft 18 is connected and driven in rotation by a further shaft 14 (FIGS. 1 and 3), which is in turn, driven in rotation by such main shaft about axis A.

Motor is a so-called “curved linear motor” and substantially comprises a plurality of fixed coils fed with electrical current and a rotor substantially consisting of a ring of permanent magnets, which are magnetically coupled with coils.

In alternative, motor could be a so-called “torque motor”.

Figure 4:
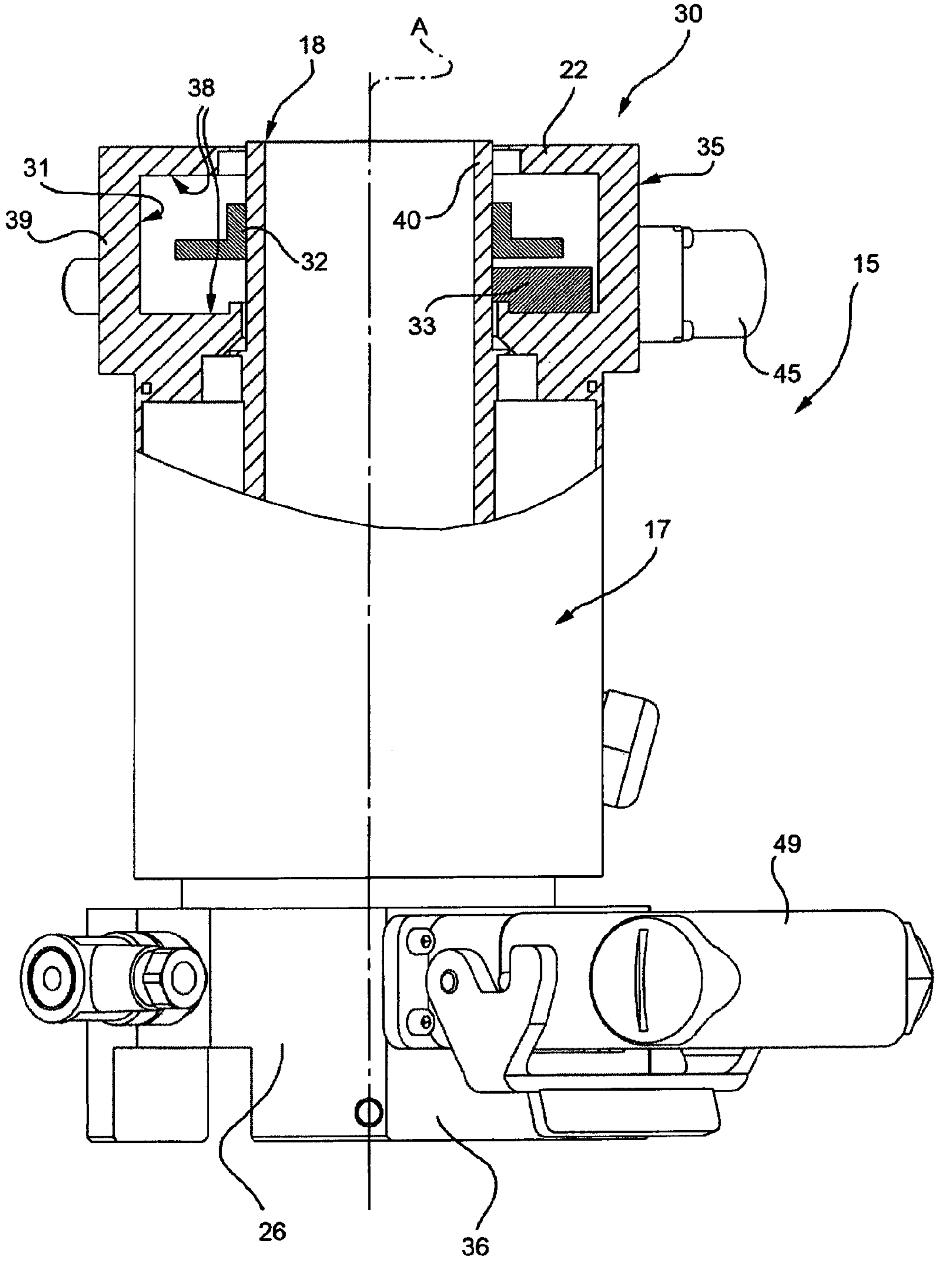
FIG. 4 is a longitudinal section of the slip-ring of FIGS. 2 and 3.
Figure 5:
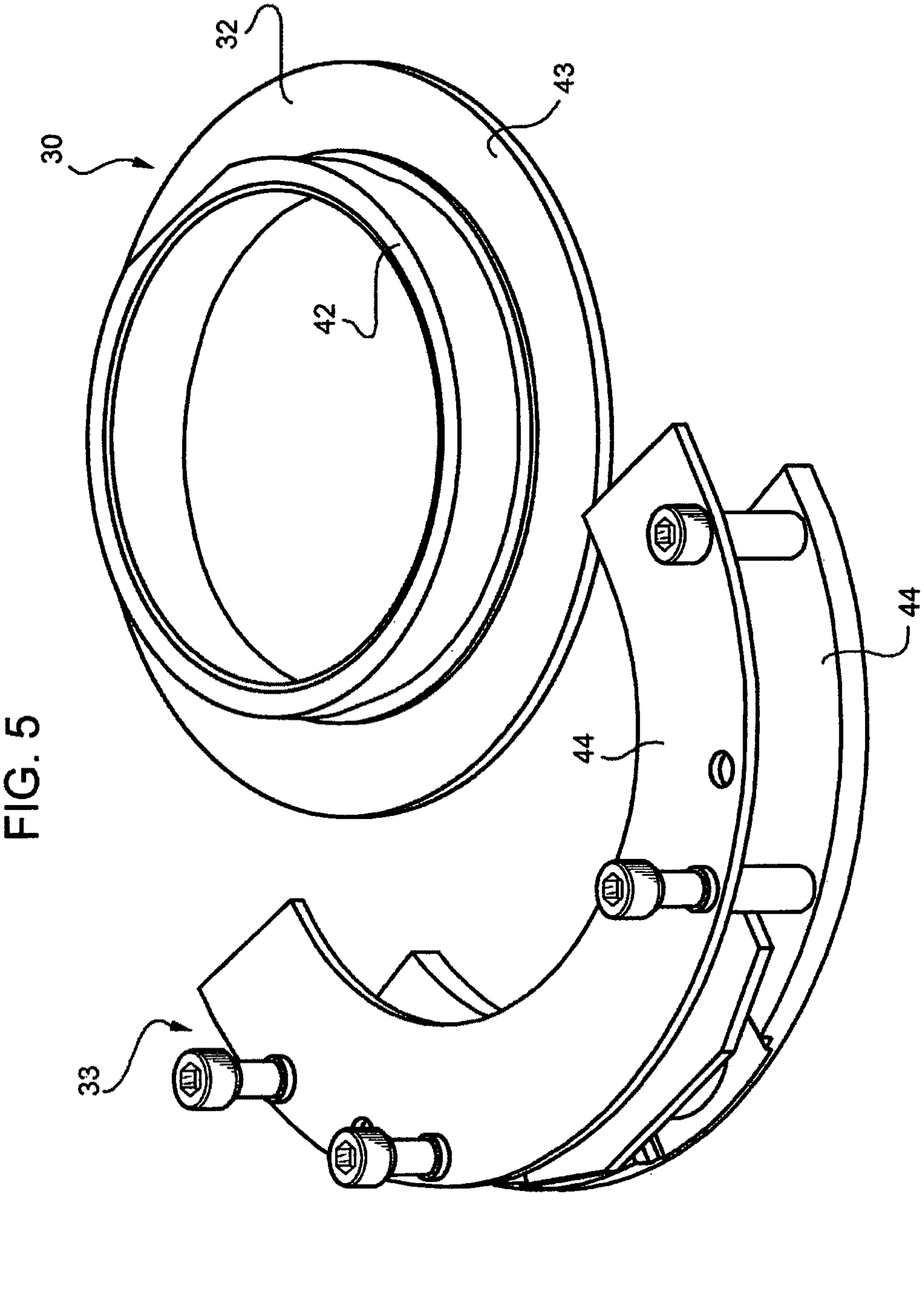
FIG. 5 is a larger-scale exploded perspective view of an encoder of labelling machine of FIG. 1.

Labelling machine advantageously comprises an encoder 30 housed within a cavity 31 defined between stator 17 and shaft 18, adapted to detect at least the angular position of wheel 6 with respect to axis A, and comprising a rotor 32 rotatable integrally with shaft 18 and a stator 33 connected to stator 17 (FIGS. 4 and 6).

In particular, slip-ring 15 extend along axis A and has a top axial end 35 arranged on the side of plate 20 and a bottom axial end 36, opposite to end 35 and arranged on the opposite side of plate 20.

Top axial end 35 of slip-ring 15 comprises flange 22 and an axial top end 40 of shaft 18. Furthermore, top axial end 35 defines cavity 31, which is annular about axis A.

Bottom axial end 36 of slip-ring 15 comprises flange 26 and a bottom axial end opposite to end 40 of shaft 18.

More precisely, flange 22 comprises a pair of annular shoulders 38 and a main body 39 extending between shoulders 38. Shoulders 38 lie on respective plane parallel one another and orthogonal to axis A while body 39 is tubular (FIG. 4).

Cavity 31 is axially bounded by shoulders 38 and is radially bounded by body 39 and end 40.

More precisely, end 40 bounds cavity 31 in a radially inner position with respect axis A while body 39 bounds cavity 31 in a radially outer position.

Slip-ring 15 is arranged above wheel 6 and defines the uppermost portion of labelling machine 1.

Slip-ring 15 also comprises an electric connector carried by flange 22 and an electric connector 45 carried by an arm 47 protruding from and hinged to appendix 23.

Electric connector 46 is adapted to feed encoder 30 with electrical power and control signals.

Furthermore, slip-ring 15 comprises an electric connector 49 hinged to flange 26 and provided with a tight-fluid inlet 48.

Connector 45 is fed by a fixed supply unit with electrical power and/or control signals and feeds stator 17 with such power and/or control signals.

Such power and/or control signals reach shaft 18 through the connection between stator 17 and shaft 18, and then reach carousel 3 through connector 49.

Rotor 32 of encoder 30 comprises a tubular element 42 fixed to shaft 18 and a flattened disk 43 surrounding element 42.

Stator 33 is fixed to stator 17 of slip-ring 15 and comprises a pair of arc-shaped elements 44 connected to one another and lying on respective planes parallel one another.

In the embodiment depicted, encoder 30 is a so-called absolute encoder and is also used for providing the motor of wheel 6 with a feed-back control signal associate to the angular position of carousel 3.

In use, carousel 3 is driven in rotation about axis A by the motor.

Labelling group applies labels onto relative containers moving along pathway P.

As carousel 3 rotates, slip-ring 15 feeds rotating components of labelling machine with electrical power and control signals.

More precisely, electrical connector 45 of stator transmits electrical power and control signals to electrical connector 48 of shaft 18.

Elements 44 of encoder 30 are fixed to stator 17 while disk 43 of encoder 30 rotates integrally with shaft 18 about axis A.

Encoder 30 detects the angular position of disk 43 and, therefore, of carousel 3 about axis A.

The output of encoder 30 is used both controlling the operation of labelling operation and the rotation of carousel 3 about axis A.

Furthermore, the output of encoder 30 is used for providing the motor with a feed-back signal relative to the angular position of the rotor of such motor.

From an analysis of the features of container-handling machine 1 made according to the present subject matter, the advantages it allows to obtain are apparent.

In particular, due to the fact that encoder 30 is housed within slip-ring 15, there is no need for a transmission group between encoder 30 and shaft of carousel 3 anymore.

Accordingly, the mechanical plays due to the above-mentioned transmission group are eliminated so that the overall accuracy of encoder 30 is highly increased.

Furthermore, encoder 30 is not affected by high-amplitude vibrations, which may penalize the measure carried out by such encoder 30.

Finally, slip-ring 15 and encoder 30 form a module which may be fitted to container-handling machine 1 without changing the design thereof, but simply providing stator 17 with flange 22.

In case that container-handling machine 1 is a labelling machine, the accuracy of the measure of encoder 30 is of the uttermost importance and, therefore, the above-mentioned advantages are particularly relevant.

As a matter of fact, in this case, even very small errors in the measure of the position of the shaft may lead to considerable errors in the final application position of labels.

In case that carousel 3 of container-handling machine 1 is driven in rotation by a so-called "curved linear motor" or a so-called "torque motor", encoder 30 is advantageously used also for providing such motor with a feed-back signal relative to the position of the motor. These feed-back signal is advantageously free from errors due to the magnetic interactions with the magnetic components of the motor.

The above-mentioned advantages applies unchanged to any kind of rotary machine comprising a slip-ring for feeding the rotating parts with signal and power, and an encoder for measuring the angular position of at least one rotating part.

Finally, it is apparent that modifications and variants not departing from the scope of protection of the claims may be made to container-handling machine 1.

The invention claimed is:

1. A container-handling machine comprising:

a carousel rotatable about an axis and supporting a plurality of holding elements adapted to cooperate with respective containers;

a slip-ring comprising a first rotor rotatable integral with said carousel about said axis, and a first stator configured to exchange, in use, at least one of a group including a power signal and control signal with said first rotor; said first stator being fixed with respect to said carousel; wherein said slip-ring extends along said axis; and comprising a first axial end portion arranged on the opposite side of said carousel, and a second axial end portion arranged on the side opposite to said carousel and defining said cavity, and an encoder housed within a cavity defined between said first stator and said first rotor, adapted to detect at least the angular position of said carousel with respect to said axis, wherein said first rotor is coaxially housed within said first stator, and in that said first stator comprises two shoulders axially spaced with respect to one another; said cavity being axially bounded between said shoulders and being radially bounded by said first rotor and said first stator, and comprising a second rotor rotatable integrally with said first rotor and a second stator connected to said first stator.

2. Container-handling machine according to claim 1, wherein said first stator comprises a flange defining said cavity; said flange comprising, in turn, a connecting element coupled with a fixed structure of said machine.

3. Container-handling machine according to claim 1, wherein said slip-ring is arranged, in use, over said carousel.

4. Container-handling machine according to claim 1, wherein said first stator and rotor are directly connected respectively to said second stator and rotor.

5. Container-handling machine according to claim 1, comprising a motor adapted to drive in rotation said carousel; said motor comprising at least a fixed coil which may be fed with alternate electrical current and a third rotor comprising at least a permanent magnet magnetically coupled with said coil; said third rotor being controllable on the basis of the measure of said encoder.

6. Container-handling machine according to claim 1, wherein said first stator and said first rotor are connected to one another via a connection that includes at least one of the group including electric connection, hydraulic connection and pneumatic connection.

7. Container-handling machine according to claim 6, wherein said first stator and rotor are electrically connected to one another.

8. Container-handling machine according to claim 7, comprising an electrical connector adapted to feed said encoder with at least one between electrical power and electrical signals, and in that said electrical connector is, at least partially, defined by said first stator of said slip-ring.

9. Container-handling machine according to claim 1, wherein said carousel may be fed with containers to be labeled and is adapted to supply as its output labeled containers.

10. A machine comprising:

a carousel rotatable about an axis;

a slip-ring comprising a first rotor rotatable integral with said carousel about said axis, and a first stator functionally connected with said first rotor and fixed with respect to said carousel, wherein said first stator and first rotor define a cavity therebetween, wherein said slip-ring extends along said axis; and comprising a first axial end portion arranged on the opposite side of said carousel, and a second axial end portion arranged on the side opposite to said carousel and defining said cavity;

an encoder housed within said cavity and adapted to detect at least the angular position of said carousel with respect to said axis, wherein said first rotor is coaxially housed within said first stator, and in that said first stator comprises two shoulders axially spaced with respect to one another; said cavity being axially bounded between said shoulders and being radially bounded by said first rotor and said first stator, and wherein said encoder comprises at least a second rotor rotatable integrally with said first rotor and a second stator connected to said first stator.

11. The machine according to claim 10, wherein said first stator comprises a flange defining said cavity; said flange comprising, in turn, a connecting element coupled with a fixed structure of said machine.

12. The machine according to claim 10, wherein said slip-ring is arranged, in use, over said carousel.

13. The machine according to claim 10, wherein said first stator and rotor are directly connected respectively to said second stator and rotor.

14. A container-handling machine comprising:

a carousel rotatable about an axis and supporting a plurality of holding elements adapted to cooperate with respective containers;

a slip-ring comprising a first rotor rotatable integral with said carousel about said axis, and a first stator configured to exchange a power signal with said first rotor; said first stator being fixed with respect to said carousel, wherein said slip-ring extends along said axis; and comprising a first axial end portion arranged on the opposite side of said carousel, and a second axial end portion arranged on the side opposite to said carousel and defining said cavity; and an encoder housed within a cavity defined between said first stator and said first rotor, adapted to detect at least the angular position of said carousel with respect to said axis, wherein said first rotor is coaxially housed within said first stator, and in that said first stator comprises two shoulders axially spaced with respect to one another; said cavity being axially bounded between said shoulders and being radially bounded by said first rotor and said first stator, and comprising a second rotor rotatable integrally with said first rotor and a second stator connected to said first stator.

15. Container-handling machine according to claim 14, wherein the first stator is configured to exchange a control signal with said first rotor.

* * * * *

UNITED STATES PATENT AND TRADEMARK OFFICE

CERTIFICATE OF CORRECTION

PATENT NO. : 8,714,343 B2
APPLICATION NO. : 13/389780
DATED : May 6, 2014
INVENTOR(S) : Secchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 192 days.

Signed and Sealed this
Twenty-ninth Day of September, 2015

Michelle K. Lee
*Director of the United States Patent and Trademark Office*